United States Patent
Isenhour et al.

(10) Patent No.: US 9,417,406 B2
(45) Date of Patent: Aug. 16, 2016

(54) CABLE ASSEMBLIES AND OPTICAL CONNECTOR ASSEMBLIES EMPLOYING A UNITARY ALIGNMENT PIN AND TRANSLATING ELEMENT

(75) Inventors: Micah C. Isenhour, Lincolnton, NC (US); Dennis M. Knecht, Hickory, NC (US); James P. Luther, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 0 days.

(21) Appl. No.: 13/601,016

(22) Filed: Aug. 31, 2012

(65) Prior Publication Data
US 2014/0064667 A1 Mar. 6, 2014

(51) Int. Cl.
*G02B 6/38* (2006.01)

(52) U.S. Cl.
CPC ............ *G02B 6/3885* (2013.01); *G02B 6/3873* (2013.01); *G02B 6/3893* (2013.01); *G02B 6/3821* (2013.01)

(58) Field of Classification Search
CPC ............................ G02B 6/3873; G02B 6/3893
USPC ...................................................... 385/52, 76
See application file for complete search history.

(56) References Cited

U.S. PATENT DOCUMENTS

| | | | |
|---|---|---|---|
| 4,518,220 A | 5/1985 | Swanson | 350/96.2 |
| 4,786,135 A | 11/1988 | Boero | 350/96.21 |
| 4,787,706 A * | 11/1988 | Cannon, Jr. | G02B 6/3831 385/24 |
| 5,109,453 A * | 4/1992 | Edwards et al. | 385/90 |
| 5,163,107 A | 11/1992 | Garriss | 385/74 |
| 5,600,747 A * | 2/1997 | Yamakawa | G02B 6/3879 385/59 |
| 5,764,833 A | 6/1998 | Kakii et al. | 385/54 |
| 6,085,003 A | 7/2000 | Knight | 385/59 |
| 6,095,695 A | 8/2000 | Ohtsuka et al. | 385/72 |
| 6,146,024 A | 11/2000 | Melchior | 385/59 |
| 6,287,017 B1 | 9/2001 | Katsura et al. | 385/59 |
| 6,302,591 B1 | 10/2001 | Nagaoka et al. | 385/59 |
| 6,309,112 B1 | 10/2001 | Lecomte | 385/59 |
| 6,416,233 B2 | 7/2002 | Shirakawa | 385/60 |
| 6,435,728 B2 | 8/2002 | Shimoji et al. | 385/56 |
| 6,530,696 B1 * | 3/2003 | Ueda et al. | 385/60 |

(Continued)

FOREIGN PATENT DOCUMENTS

| | | | | |
|---|---|---|---|---|
| EP | 1016885 A1 | 7/2000 | | G02B 6/38 |
| GB | 2399893 A | 9/2004 | | G02B 6/36 |

OTHER PUBLICATIONS

Patent Cooperation Treaty International Search Report and Written Opinion for International Application No. PCT/US2013/056558; mailing date Nov. 22, 2013—10 pages.

*Primary Examiner* — Charlie Y Peng

(57) ABSTRACT

Cable assemblies, optical connector assemblies, and optical connector subassemblies employing a translating element and a unitary alignment pin are disclosed. In one embodiment, an optical connector assembly includes a connector housing defining a connector enclosure and a connector housing opening, a unitary alignment pin including a first pin portion and a second pin portion, and a translating element including a first bore, a second bore, and an optical interface. The unitary alignment pin is secured within the connector enclosure. The first pin portion is disposed within the first bore and the second pin portion is disposed within the second bore such that the translating element translates along the first pin portion and the second pin portion within the connector enclosure.

24 Claims, 9 Drawing Sheets

(56) References Cited

U.S. PATENT DOCUMENTS

| | | | |
|---|---|---|---|
| 6,729,770 B2 | 5/2004 | Brun et al. | 385/60 |
| 6,736,547 B2 | 5/2004 | Stevens et al. | 385/61 |
| 6,764,224 B2 | 7/2004 | Brun et al. | 385/84 |
| 6,767,139 B2 | 7/2004 | Brun et al. | 385/84 |
| 6,767,141 B1 | 7/2004 | Dudek et al. | 385/92 |
| 6,960,026 B2 | 11/2005 | Brun et al. | 385/78 |
| 7,168,860 B2 | 1/2007 | Kim et al. | 385/62 |
| 7,204,646 B2 | 4/2007 | Sasaki et al. | 385/88 |
| 7,212,698 B2 * | 5/2007 | Bapst et al. | 385/14 |
| 7,334,944 B1 | 2/2008 | Uhlhorn et al. | 385/74 |
| 7,717,625 B2 | 5/2010 | Margolin et al. | 385/71 |
| 7,775,725 B2 | 8/2010 | Grinderslev | 385/74 |
| 7,883,276 B2 | 2/2011 | Davidson et al. | 385/58 |
| 8,109,679 B2 | 2/2012 | Danley et al. | 385/85 |
| 8,373,259 B2 * | 2/2013 | Kim et al. | 257/678 |
| 8,757,893 B1 * | 6/2014 | Isenhour | G02B 6/3886 385/76 |
| 8,774,577 B2 | 7/2014 | Benjamin et al. | |
| 2003/0007739 A1 | 1/2003 | Perry et al. | 385/60 |
| 2004/0081405 A1 | 4/2004 | Stevens et al. | 385/56 |
| 2004/0184738 A1 * | 9/2004 | McColloch et al. | 385/53 |
| 2010/0080563 A1 | 4/2010 | DiFonzo et al. | |
| 2010/0129031 A1 | 5/2010 | Danley et al. | 385/59 |
| 2010/0303420 A1 | 12/2010 | Lin et al. | 385/74 |
| 2011/0091156 A1 | 4/2011 | Laughlin | 385/34 |
| 2011/0097042 A1 | 4/2011 | Liao et al. | 385/74 |
| 2011/0158588 A1 | 6/2011 | Little et al. | 385/74 |
| 2011/0158590 A1 | 6/2011 | Harlan | 385/74 |
| 2011/0158591 A1 | 6/2011 | Harlan | 385/77 |
| 2011/0194818 A1 | 8/2011 | Wu | 385/74 |
| 2011/0229083 A1 * | 9/2011 | Dainese J nior et al. | 385/74 |
| 2011/0229090 A1 | 9/2011 | Isenhour et al. | 385/78 |
| 2012/0039562 A1 | 2/2012 | Tan et al. | 385/14 |
| 2012/0099822 A1 * | 4/2012 | Kuffel et al. | 385/78 |
| 2012/0219255 A1 * | 8/2012 | Bradley | G02B 6/3851 385/78 |
| 2014/0185991 A1 * | 7/2014 | de Jong | G02B 6/32 385/79 |

* cited by examiner

CABLE ASSEMBLIES AND OPTICAL CONNECTOR ASSEMBLIES EMPLOYING A UNITARY ALIGNMENT PIN AND TRANSLATING ELEMENT

BACKGROUND

1. Field of the Disclosure

The technology of the disclosure relates to optical connectors having a translating element, wherein the translating element may be utilized for facilitating optical connections.

2. Technical Background

Benefits of optical fiber include extremely wide bandwidth and low noise operation. Because of these advantages, optical fiber is increasingly being used for a variety of applications, including, but not limited to, broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support optical fiber interconnections. Additionally, optical cable assemblies may be utilized in consumer applications to communicate between personal computing devices and auxiliary electronic device, such as smart phones, media players, external storage components, and the like.

SUMMARY OF THE DETAILED DESCRIPTION

Fiber optic connectors are provided to facilitate optical connections with optical fibers for the transfer of light. For example, optical fibers can be optically connected to another optical device, such as a light-emitting diode (LED), laser diode, or opto-electronic device, for light transfer. As another example, optical fibers can be optically connected to other optical fibers through mated fiber optic connectors. In any of these cases, it is important that the end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

Flat end-faced multi-fiber ferrules may be provided to more easily facilitate multiple optical fiber connections between the fiber optic connector supporting the ferrule and other fiber optic connectors or other optical devices. In this regard, it may be important that fiber optic connectors be designed to allow the end faces of the optical fibers disposed in the ferrule to be placed into contact or closely spaced with an optical device or other optical fiber for light transfer. In conventional multi-fiber, fiber optic connectors, the excess fiber is removed by laser cleaving and the remaining protruding fiber precision polished to form a highly planar fiber array. When these connectors are mated, the end faces touch providing for low loss. This high precision polishing is costly and difficult.

Gradient index (GRIN) lenses offer an alternative to high precision polishing. GRIN lenses focus light through a precisely controlled radial variation of the lens material's index of refraction from the optical axis to the edge of the lens. The internal structure of this index gradient can dramatically reduce the need for high precision polishing and results in a simple, compact lens. This allows a GRIN lens with flat surfaces to collimate light emitted from an optical fiber or to focus an incident beam into an optical fiber. The GRIN lens can be provided in the form of a glass rod that is disposed in a lens holder as part of a fiber optic connector. The flat surfaces of a GRIN lens allow easy bonding or fusing of one end to an optical fiber disposed inside the fiber optic connector with the other end of the GRIN lens disposed on the ferrule end face. The flat surface on the end face of a GRIN lens can reduce aberrations, because the end faces can be polished to be planar to slightly inset with respect to the end face of the ferrule. The flat surface of the GRIN lens allows for easy cleaning of end faces of the GRIN lens. It is important that the lens holder assembly be designed with internal holders that place and secure the GRIN lenses in alignment with the desired angular accuracy to avoid or reduce coupling loss. Optical connectors having the unitary alignment pins and translating elements disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer.

Embodiments disclosed herein are directed to optical cable assemblies, optical connector assemblies, and optical connector subassemblies having a unitary alignment pin on which a translating element maintaining an optical interface may translate within a housing. Non-limiting examples of such optical connectors include plugs and receptacles. In one embodiment, the translating element maintains one or more GRIN lenses. The unitary alignment pin has a first pin portion and a second pin portion, and is fabricated from a single component rather than two or more components. Use of a single component may reduce complexity and cost. The translating element may include first and second bores that accept first and second pin portions, respectively. The translating element, which may be biased toward an opening of the connector housing by one or more bias members, may translate on the first and second pin portions within the connector housing. When the translating element is in an unconnected state and positioned toward the connector housing opening, the optical interface is easily accessible to a user for cleaning purposes. Upon connection to a mated optical connector, such as a receptacle, the translating element translates back within the connector housing by contact with a face of the mated optical connector.

In this regard, in one embodiment, an optical connector assembly includes a connector housing defining a connector enclosure and a connector housing opening, a unitary alignment pin including a first pin portion and a second pin portion, and a translating element including a first bore, a second bore, and an optical interface. The unitary alignment pin is secured within the connector enclosure. The first pin portion is disposed within the first bore and the second pin portion is disposed within the second bore such that the translating element translates along the first pin portion and the second pin portion within the connector enclosure.

In another embodiment, an optical connector subassembly includes a guide frame, a unitary alignment pin coupled to the guide frame, a translating element, and first and second bias members. The guide frame includes a base portion, a first arm portion, and a second arm portion. The first arm portion and the second arm portion extend from the base portion such that there is a gap between the first arm portion and the second arm portion. The guide frame is configured to be disposed in a connector housing. The unitary alignment pin includes a first pin portion and a second pin portion and is secured to the guide frame at the base portion. The first pin portion and the second pin portion are positioned within the gap between the first arm portion and the second arm portion. The translating element includes a first bore, a second bore, and an optical interface. The first pin portion is disposed within the first bore and the second pin portion is disposed within the second bore. The first bias member is disposed about the first pin portion between the translating element and the base portion of the guide frame, and the second bias member is disposed about the second pin portion between the translating element and the base portion of the guide frame such that the translating element translates along the first pin portion and the second pin portion.

In yet another embodiment, a cable assembly includes an optical connector body, an optical cable extending from a rear portion of the optical connector body, a plug housing extending from a front surface of the optical connector body, a unitary alignment pin having a first pin portion and a second pin portion, and translating element. The optical cable has at least one optical fiber. The plug housing defines an optical connector opening. The unitary alignment pin is disposed within the optical connector body and the plug housing. The translating element includes a first bore, a second bore, and at least one GRIN lens. The first pin portion is disposed within the first bore and the second pin portion is disposed within the second bore such that the translating element translates along the first pin portion and the second pin portion. The at least one optical fiber is optically coupled to the at least one GRIN lens.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Figure 1:
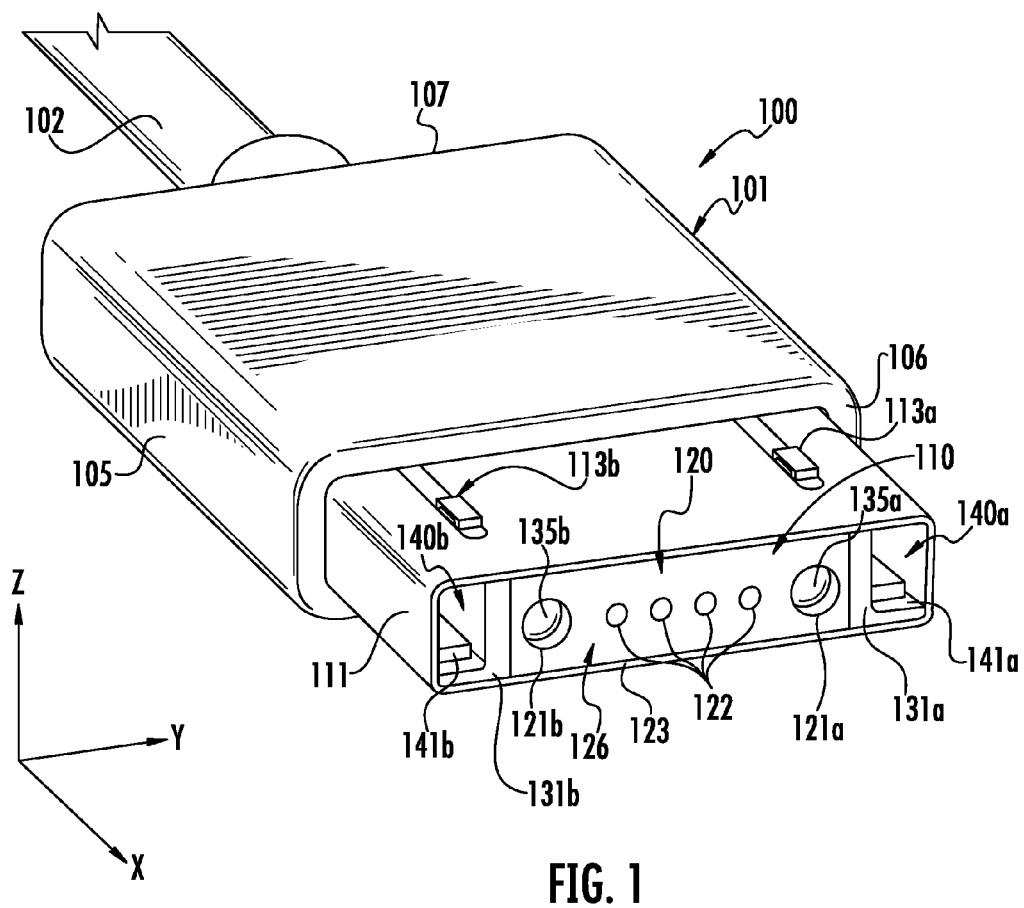
FIG. 1 is a front perspective view of an exemplary optical connector assembly of an exemplary cable assembly.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include optical cable assemblies, optical connector assemblies, and optical connector subassemblies employing a translating element having an optical interface for passing optical signals, and a unitary alignment pin on which the translating element is free to translate. Non-limiting examples of connectors include plugs and receptacles. The translating elements described herein are configured to translate within a connector housing on a unitary alignment pin. The unitary alignment pin is a single, unitary component having a first pin portion and a second pin portion that are disposed within first and second bores through the translating element. The unitary alignment pin may reduce complexity and cost over the use of multiple alignment pin components. The translating element is biased toward an opening of the connector housing such that when the optical connector is in a disengaged state, a coupling surface and optical interface of the translating element is accessible to a user for the wiping away of debris and liquid. When the optical connector is coupled to a mated optical connector, such as a receptacle of an electronic device, for example, the translating element is translated back into the connector housing along the first and second pin portions of the unitary alignment pin.

The unitary alignment pin may be configured as a precision wire that is bent into the desired form having a first and second pin portions on which the translating element slides. In some embodiments, the unitary alignment pin comprises bent portion that act as engagement and alignment features for precise placement within the optical connector assembly. As described in detail below, the configuration of the unitary alignment pin may take on a variety of forms.

In one embodiment, the translating element comprises one or more internal groove alignment features configured to secure one or more gradient index (GRIN) lenses in the translating element. The groove alignment features are also configured to accurately align the end faces of the GRIN lenses. In another embodiment, the translating element comprises one or more refractive lens at the optical interface for optically coupling the translating element to a mated connector.

A fiber optic connector assembly containing the unitary alignment pins disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer. As a non-limiting example, the optical connectors disclosed herein can be provided as part of a plug or receptacle containing one or more optical fibers for establishing optical connections.

In this regard, FIG. 1 is a perspective view of an assembled exemplary cable assembly 100 comprising an optical connector assembly 101 employing a translating element 110 configured to support and align optical components 122 of an optical interface 120 to pass optical signals through the lens holder assembly. The optical connector assembly 101 in the illustrated embodiment is configured as a male plug connector. For example, the optical connector assembly 101 may be a fiber optic connection plug that supports optical components for establishing optical connections and communication over the cable assembly 100.

More specifically, the optical connector assembly 101 generally comprises a connector housing 105 having a plug housing 111 extending from a front surface 106. The plug housing 111 defines a plug portion that may be inserted into a receptacle 270 (FIG. 3). In other embodiments, the optical connector assembly 101 may not include a plug housing 111. In such embodiments, the optical connector assembly 101 may be configured as a female optical connector, wherein the connector housing 105 defines an opening to expose a coupling surface 126 of the translating element 110.

The optical connector assembly 101 further comprises optical fibers 104 disposed in a cable 102 extending from a rear surface 107 of the connector housing 105. The plug housing 111 comprises engagement tabs 113a, 113b that are configured to engage mated engagement tabs 275a, 275b of a receptacle housing 272, as described below with reference to FIG. 3.

In the illustrated embodiment, the plug housing 111 defines an optical connector opening 123 that exposes the translating element 110 that is maintained in a connector enclosure defined in part by the plug housing 111. As depicted in FIGS. 1, 3A-3C, the translating element 110 of the particular embodiment is configured to translate along an x-axis (i.e., an optical axis of the optical connector assembly 101) within the connector housing 105. Still referring to FIG. 1, the illustrated translating element 110 comprises a coupling surface 126. Optical components, such as GRIN lenses 122, refractive lenses, and the like, are exposed at the coupling surface 126 to align the optical components, such as the optical fibers 104, within the translating element to a mated optical connector. Although embodiments described herein recite GRIN lenses, other optical components may be disposed within the translating element 110, such as optical fiber stubs and waveguides, for example.

The GRIN lenses 122 focus light through a precisely controlled radial variation of the lens material's index of refraction from the optical axis to the edge of the lens. The internal structure of this index gradient can dramatically reduce the need for tightly controlled surface curvatures and results in a simple, compact lens. This allows the GRIN lenses 122 with flat surfaces to collimate light emitted from the optical fibers 104 or to focus an incident beam into the optical fibers 104. In this embodiment, the GRIN lenses 122 are provided in the form of glass rods that are disposed in the translating element 110. The flat end face surfaces of the GRIN lenses 122 allow simple optical coupling of ends of the GRIN lenses 122 to end portions of the optical fibers 104 inside the optical connector assembly 101, with the other end of the GRIN lenses 122 disposed on the coupling surface 126 of the translating element 110. The flat end face surfaces of the GRIN lenses 122 can also reduce aberrations.

Further, with continuing reference to FIG. 1, the end faces of the GRIN lenses 122 can be planar to slightly inset to the coupling surface 126 (e.g., within 0-25 μm). In some embodiments, the end faces of the GRIN lenses 122 may be slightly recessed with respect to the coupling surface 126 to avoid physical contact with the GRIN lenses of a mated optical connector to prevent damage to the GRIN lenses 122. If the offset distance between the end faces of the GRIN lenses 122 is too large, it may create a dirt collection recess. In alternative embodiments the end faces of the GRIN lenses 122 may be flush with the coupling surface 126. The flat surface of the GRIN lenses 122 allows for easy cleaning of end faces of the GRIN lenses 122. As will be discussed in more detail below, the translating element 110 may be designed with internal alignment features that support and align the GRIN lenses 122 in alignment with translating element 110 and the optical connector assembly 101 to avoid or reduce coupling loss between the GRIN lenses 122 and optical components optically connected to the GRIN lens 122 through a mating to the optical connector assembly 101.

The exemplary translating element 110 of the optical connector assembly 101 depicted in FIG. 1 comprises a first bore 121a and a second bore 121b. The first and second bores 121a, 121b fully extend through the body of the translating element 110. As described in detail below, the optical connector assembly 101 comprises a unitary alignment pin 132 having a first pin portion 135a and a second pin portion 135b. The first pin portion 135a is disposed within the first bore 121a of the translating element and the second pin portion 135b is disposed within the second bore 121b of the translating element. The translating element 110 may translate back and forth along the x-axis (i.e., the optical axis of the optical connector assembly) on the first and second pin portions 135a, 135b within the connector enclosure defined by the plug housing 111 and the connector housing 105.

The illustrated optical connector assembly 101 further comprises a guide frame 130 comprising a first arm portion 131a and a second arm portion 131b that is disposed within a connector enclosure defined by the plug housing 111. The guide frame 130 is described in detail below with reference to FIGS. 3A-3C. Generally, the first and second arm portion 131a, 131b act as a guide for the translation of the translating element 110 within the plug housing 111 and the connector housing 105. The first arm portion 131a and the second arm portion 131b of the guide frame 130 of the illustrated embodiment are configured to define a first opening 140a and a second opening 140b within the plug housing 111 that are adjacent to the translating element 110. A first electrical contact 141a may be positioned on the first arm portion 131a and exposed within the first opening 140a and a second electrical contact 141b may be positioned on the second arm portion 131b and exposed within the second opening 140b. The first and second openings may be configured to accept engagement prongs 282a, 282b (see FIG. 3) of a mated optical connector assembly to robustly couple the optical connector assembly 101 to the mated optical connector assembly by resisting external angular forces upon the optical connector assembly 101 that may disturb the optical connection between the coupled components. The first and second electrical contacts 141a, 141b may be configured to pass electrical power and/or data across the cable assembly 100. In such an embodiment, electrical conductors may span the length of the cable 102.

In other embodiments, the first and second arm portions 131a, 131b may not define opening within the plug housing 111 for receipt of engagement prongs. In this embodiment, the first and second arm portions 131a, 131b have a face that is approximately flush with respect to the plug housing 111 at the opening 123. In still further embodiments, the first and second arm portions 131a, 131b may define first and second openings 140a, 140b wherein the first and second electrical contacts are not provided.

Figure 2:
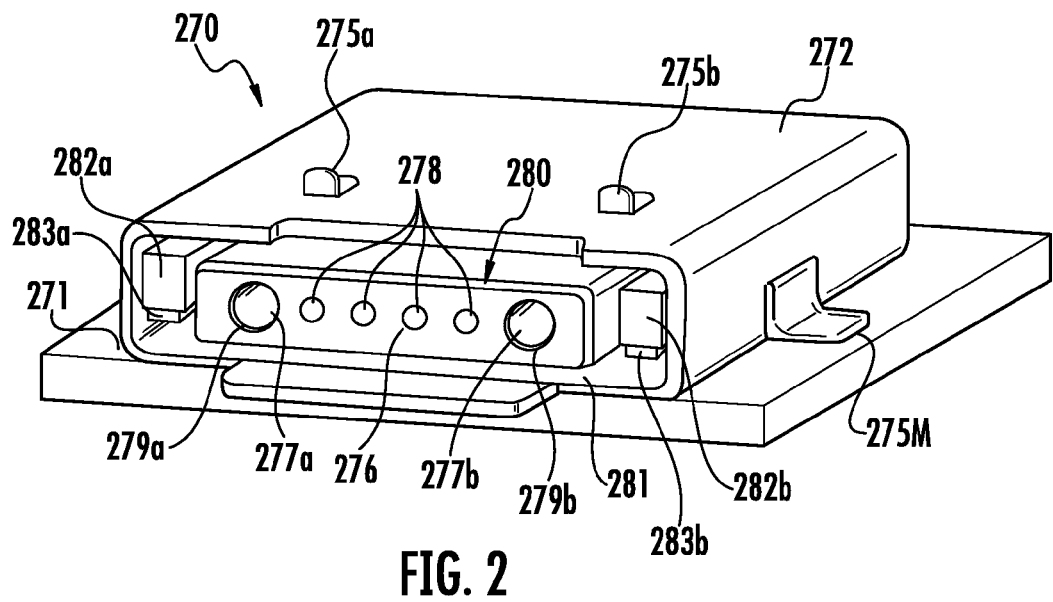
FIG. 2 is a front perspective view of an exemplary receptacle configured to mate with the exemplary optical connector depicted in FIG. 1.

FIG. 2 depicts a mated optical connector assembly configured as a receptacle 270 configured to be mated to the optical connector assembly 101 depicted in FIG. 1. It should be understood that receptacle 270 is provided as an example, and other configurations are also possible. The receptacle 270 may provide a communications port for an electronic device, such as, but not limited to, a personal computer, an electronic data storage device, a tablet computer, a mobile communications device, and an application specific computing device. The receptacle 270 illustrated in FIG. 2 generally comprises a receptacle housing 272 that is coupled to a printed circuit board (PCB) 271, which may be a PCB maintained within a housing of an electronic device. The exemplary receptacle housing 272 comprises mounting tabs 275M which may be used to couple the receptacle housing 272 to the PCB 271, such as by the use of solder or an adhesive. The receptacle housing 272 further comprises engagement tabs 275a, 275b that are configured to be removably engaged with the engagement tabs 113a, 113b of the plug housing 111 when the two components are coupled together.

The receptacle 270 further comprises a lens holder assembly 280 disposed within an enclosure defined by the receptacle housing 272 such that a gap 281 exists between an outer surface of the lens holder assembly 280 and an inner surface of the receptacle housing 272. The gap 281 is configured to receive the plug housing 111 when the optical connector assembly 101 is inserted into the receptacle 270. The illustrated lens holder assembly 280 comprises a seamless, planar mating face 276 that is configured to couple with the coupling surface 126 of the translating element 110 of the optical connector assembly 101. Although the illustrated lens holder assembly 280 is depicted as a single-piece component in FIG. 3, embodiments are not limited thereto. As an example and not a limitation, the lens holder assembly 280 may comprise a multi-component assembly comprising a lens holder body and a recessed cover. Further, a multi-component receptacle lens holder assembly may also have groove alignment features as described above.

GRIN lenses 278 may be disposed within the lens holder assembly 280 such that end faces of the GRIN lenses 278 are planar to slightly inset with respect to the mating face 276 (e.g., within 0-50 μm). Other optical components may be utilized for the optical interface, such as refractive lenses, fiber stubs, fiber ends, waveguides, and the like. The GRIN lenses 278 (or other optical components) should be arranged within the lens holder assembly 280 for alignment with the GRIN lenses 122 (or other optical components) of the optical connector assembly 101 when the optical connector assembly 101 is mated with the receptacle 270.

The lens holder assembly 280 additionally comprises a first bore 279a and a second bore 279b adjacent to the GRIN lenses 278 and configured to receive the first and second pin portions 135a, 135b of the optical connector assembly 101, respectively, when the optical connector assembly 101 is inserted into the receptacle 270. The first and second pin portions 135a, 135b of the optical connector assembly 101 and the first and second bores 279a, 279b of the receptacle 270 provide an optical alignment of the mated GRIN lenses 122, 278. The first and second bores 279a, 279b may also comprise a sleeve 277a, 277b as a bushing element to reduce friction between the first and second pins portions 135a, 135b and the inner surface of the first and second bores 279a, 279b. The sleeve may be made out of a lubricious material, such as, but not limited to, sintered bronze. Sleeves may also be provided in the first and second bores 121a, 121b of the translating element 110.

First and second engagement prongs 282a, 282b may be provided adjacent to the lens holder assembly 280 in embodiments where the guide frame 130 of the optical connector assembly 101 defines first and second openings 140a, 140b. The first and second engagement prongs 282a, 282b are configured to be slideably disposed within the first and second openings 140a, 140b of the optical connector assembly 101. The illustrated receptacle 270 includes a first receptacle electrical contact 283a located on an underside surface of the first engagement prong 282a, and a second receptacle electrical contact 283b located on an underside surface of the second engagement prong 282b. The first and second receptacle electrical contacts 283a, 283b are configured to be slideably and electrically coupled to the first and second electrical contacts 141a, 141b of the optical connector assembly 101 when the first and second engagement prongs 282a, 282b are positioned within the first and second openings 140a, 140b of the optical connector assembly 101 to provide electrical connectivity between the optical connector assembly 101 and the receptacle 270. It should be understood that, in other embodiments, the receptacle 270 may not include the first and second engagement prongs or the first and second receptacle electrical contacts.

As described in more detail below, when the optical connector assembly 101 is pushes into the receptacle 270 by the user, the coupling surface 126 of the translating element 110 contacts the mating face 276 of the lens holder assembly 280 such that the mating face 276 pushes the translating element 110 back into the connector housing 105.

Figure 3B:
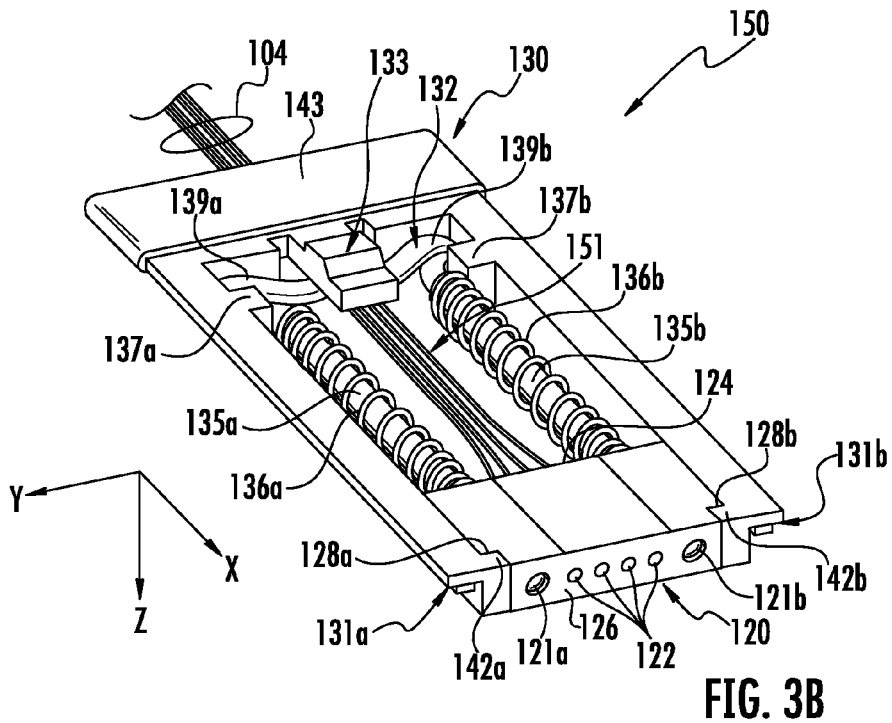
FIG. 3B is a bottom perspective view of the exemplary optical connector subassembly depicted in FIG. 3A.
Figure 3A:
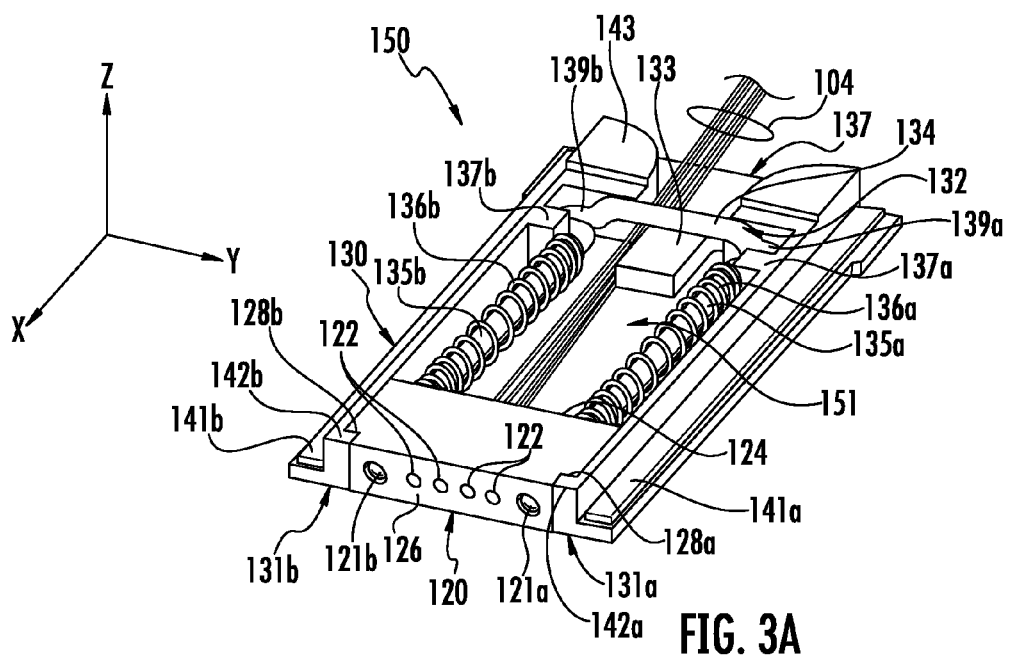
FIG. 3A is a top perspective view of an exemplary optical connector subassembly wherein the translating element is biased in a forward position.
Figure 3C:
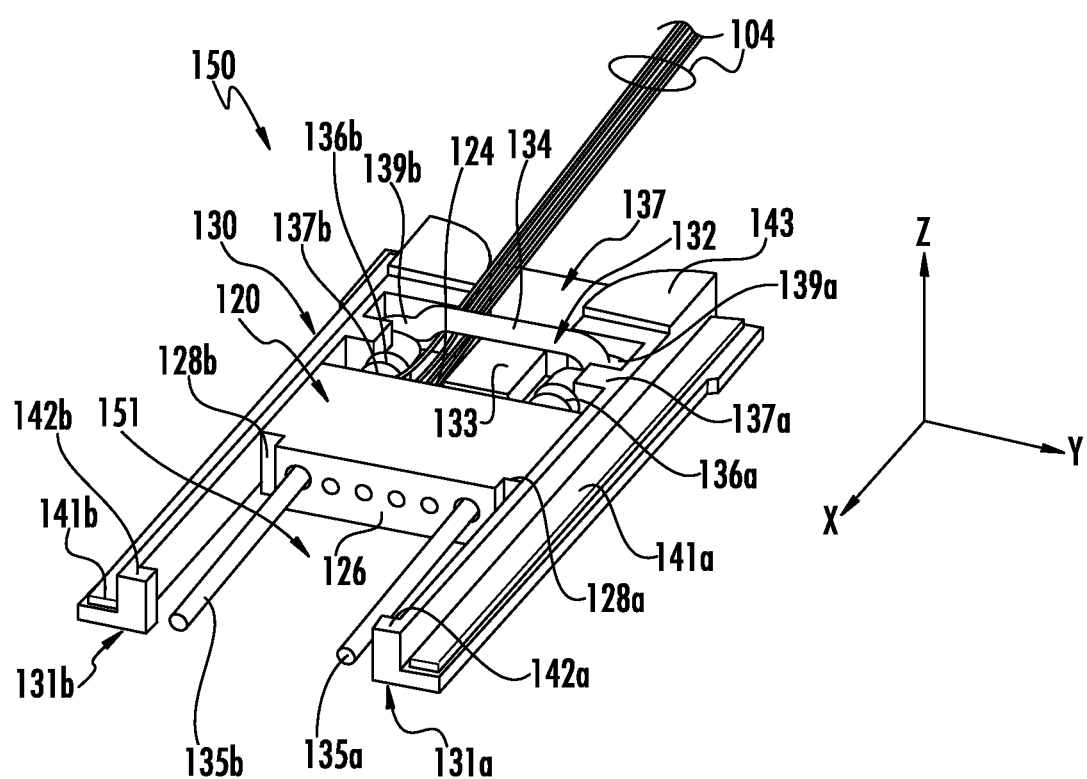
FIG. 3C is a top perspective view of the exemplary optical connector subassembly depicted in FIG. 3A wherein the translating element is in a retracted position.

Referring now to FIGS. 3A-3C, an exemplary optical connector subassembly 150 configured to be disposed within a connector enclosure defined by the connector housing 105 and the plug housing 111 is illustrated. FIG. 3A is a top perspective view of the exemplary optical connector subassembly 150, while FIG. 3B is a bottom perspective view of the exemplary optical connector subassembly 150 depicted in FIG. 3A. FIG. 3C is a top perspective view of the exemplary optical connector subassembly 150 depicted in FIG. 3A wherein the translating element 110 is translated back along the x-axis in a negative direction.

The optical connector subassembly 150 generally comprises the guide frame 130, the translating element 110, the unitary alignment pin 132, and first and second bias members 136a, 136b. The first and second arm portions 131a, 131b define an open region 151 in which the translating element 110 is positioned and may translate along the x-axis. The first and second arm portions 131a, 131b act as a guide for the translation of the translating element 110 such that it is prevented from substantial movement along the y-axis. Movement along the z-axis may be prevented by the interior surface of the plug housing 111. The first and second arm portions 131a, 131b may include grooves or other features (not shown) to ensure slideable engagement with the translating element 110.

Figure 4A:
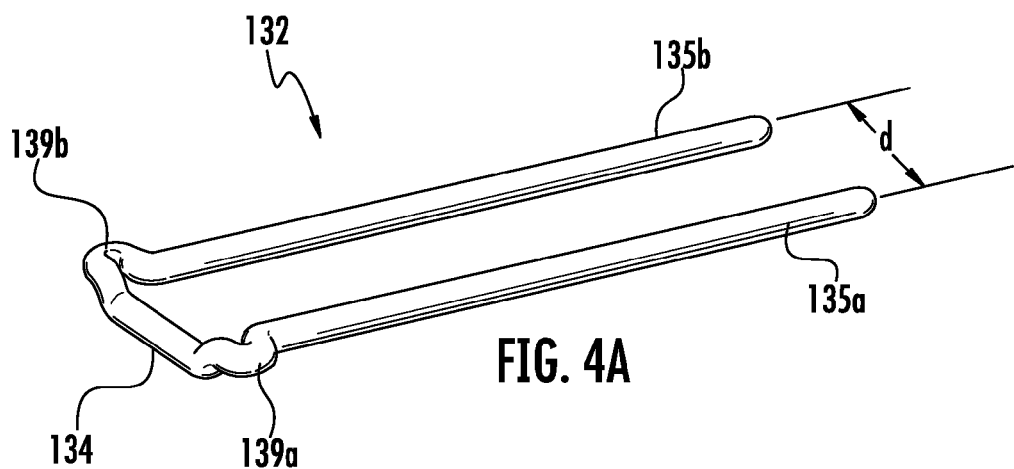
FIG. 4A is a top perspective view of an exemplary unitary alignment pin of the exemplary optical connector subassembly depicted in FIGS. 3A-3C.
Figure 4B:
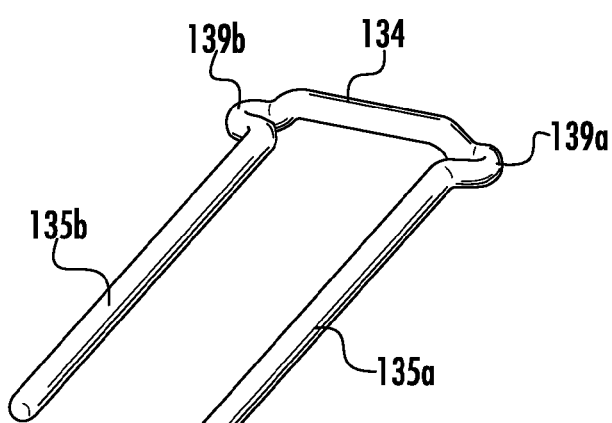
FIG. 4B is a bottom perspective view of the exemplary unitary alignment pin depicted in FIG. 4A.

The unitary alignment pin 132 is configured to be secured to the guide frame 130. The unitary alignment pin 132 may mechanically be engaged with the guide frame 130 and/or be secured using a suitable adhesive. FIGS. 4A and 4B depict the exemplary unitary alignment pin 132 depicted in FIGS.

3A-3C in greater detail. The unitary alignment pin 132 may be configured as a precision wire that is bent, molded or otherwise worked into the desired configuration that provides the first pin portion 135a and the second pin portion 135b, wherein the first and second pin portions 135a, 135b are substantially parallel with respect to one another, and separated by a distance d that corresponds to a distance between the first and second bores 121a, 121b of the translating element 110.

The unitary alignment pin 132 illustrated in FIGS. 4A and 4B have a first bent portion 139a and a second bent portion 139b that transition a rear portion 134 of the unitary alignment pin 132 into first and second pin portions 135a, 135b, respectively. The first and second bent portions 139a, 139b define two protruding portions that protrude away from the first and second pin portions 135a, 135b along the y-axis. These protruding portions (i.e., first and second bent portions 139a, 139b) are used as engagement mechanisms to couple the unitary alignment pin 132 to the guide frame 130 in the embodiment depicted in FIGS. 3A-3C. Referring now to FIGS. 3A-3C, the first and second arms 131a, 131b each comprise an engagement feature 137a, 137b proximate a base portion 143 of the guide frame 130. The engagement features 137a, 137b protrude inwardly from the first and second arms 131a, 131b along the y-axis. The first and second bent portions 139a, 139b may be positioned between the engagement features 137a, 137b and the base portion 143 of the guide frame 130 (e.g., by an interference fit). In this manner, the unitary alignment pin 132 may be secured to the guide frame 130, which is then disposed within the connector housing 105 and the plug housing 111. The first and second bent portions 139a, 139b may also be secured to the engagement features 137a, 137b by a suitable adhesive, for example.

The rear portion 134 of the unitary alignment pin 132 of the illustrated embodiment is off centerline with respect to the z-axis. In other words, the rear portion 134 is in a plane that is different from the plane in which the first and second pin portions 135a, 135b are positioned. As shown in FIGS. 3A-3C, the base portion 143 of the guide frame 130 may include a tab feature 133 that extends from the base portion 143 along the positive x-axis and is configured to support the rear portion 134 of the unitary alignment pin 132 as well as provide a stopping surface for the translating element 110 when it is retracted within the connector enclosure. Referring specifically to FIG. 3A, the base portion 143 of the guide frame 130 further comprises a fiber groove 137 through which the optical fibers 104 may pass between the translating element 110 and the cable 102. Because the rear portion 134 of the unitary alignment pin 132 is off centerline, the optical fibers 104 may pass under the rear portion 134 and through the fiber groove 137.

The optical connector subassembly may further comprise first and second bias members 136a, 136b. In the illustrated embodiment, the first and second bias members 136a, 136b are configured as compression springs, wherein the first bias member 136a is positioned about the first pin portion 135a and the second bias member 136b is positioned about the second pin portion 135b. In alternative embodiments, the bias members may not be positioned about the first and second pin portions 135a, 135b, a single bias member may be used, or more than two bias members may be used. The first and second bias members 136a, 136b bias the translating element 110 toward the opening 123 of the plug housing 111 such that the coupling surface 126 is accessible to a user for cleaning when the optical connector assembly 101 is in a disengaged state.

The exemplary translating element 110 includes first and second notch portions 128a, 128b that are adjacent to the first and second bores 121a, 121b, respectively. The ends first and second arm portions 131a, 131b comprise a first stop feature 142a and a second stop feature 142b, respectively. The first and second stop features 142a, 142b extend from the first and second arm portions 131a, 131b inwardly along the y-axis. The first and second notch portions 128a, 128b engage the first and second stop features 142a, 142b when the translating element 110 is biased forward along the x-axis, thereby maintaining the translating element 110 within the guide frame 130. Other configurations to maintain the translating element 110 within the guide frame 130 may also be provided.

Referring now to FIG. 3C, the optical connector subassembly 150 is depicted in an engaged state wherein the translating element 110 has moved back into the guide frame 130 negatively along the x-axis due to insertion of the optical connector assembly 101 (not shown in FIG. 3C) into a mated receptacle (not shown in FIG. 3C). Translation of the translating element 110 as shown in FIG. 3C exposes the first and second pin portions 135a, 135b for insertion into corresponding bores of the mated receptacle to optically align the optical components (e.g., GRIN lenses 122) with optical components of the receptacle to pass optical signals therebetween. Upon disconnection of the optical connector assembly 101 from the receptacle, the first and second bias members 136a, 136b may push the translating element back toward the front of the optical connector assembly 101, as shown in FIG. 1. It is noted that in some embodiments, the unitary alignment pin may be utilized in optical connectors wherein the coupling surface (e.g., on the translating element) does not translate on the first and second pin portions. Rather, in such embodiments, the both translating element 110 and the unitary alignment pin 132 are free to move within the connector enclosure. For example, the unitary alignment pin 132 may be fixed within the translating element 110, wherein the first and second pin portions 135a, 135b extend from the coupling surface 126 of the translating element 110. As an example and not a limitation, the unitary alignment pins described herein may be utilized in Multiple-Fiber Push-On (MPO) connectors.

Figure 5:
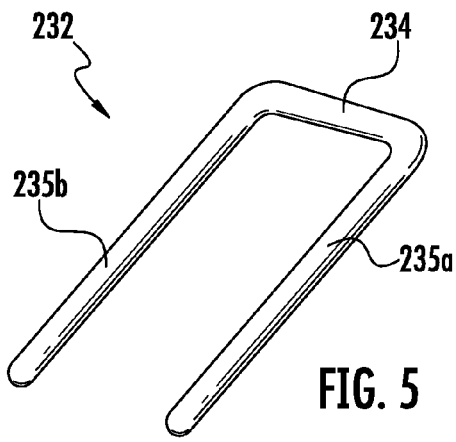
FIG. 5 is a top perspective view of an exemplary unitary alignment pin wherein the rear portion is in the same plane as first and second pin portions.
Figure 6:
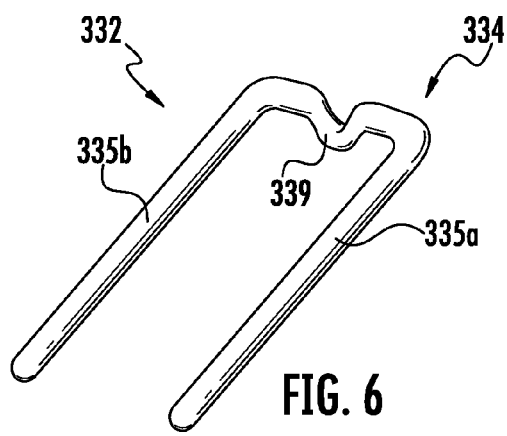
FIG. 6 is a top perspective view of an exemplary unitary alignment pin having a single bent portion.
Figure 7:
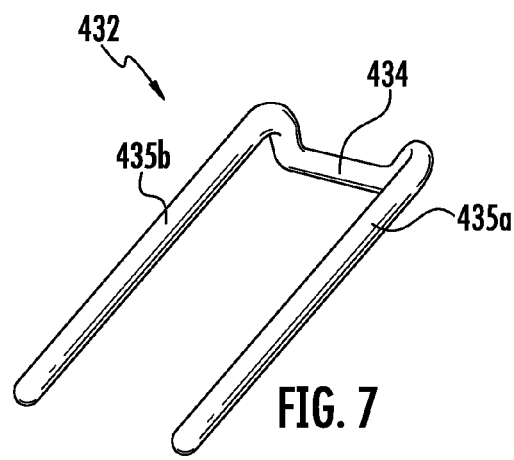
FIG. 7 is a top perspective view of an exemplary unitary alignment pin having an off centerline rear portion.

Unitary alignment pin configurations other than the configuration depicted in FIGS. 2A-4B are contemplated. FIGS. 5-7 depict alternative unitary alignment pin configurations. It should be understood that embodiments are not limited to the unitary alignment pins depicted in the figures, as many other alternative configurations are possible. FIG. 5 depicts a unitary alignment pin 232 having a first and second pin portion 235a, 235b that extend from a rear portion 234. Unlike the unitary alignment pin 132 depicted in FIGS. 4A and 4B, the unitary alignment pin 232 depicted in FIG. 5 does not include the first and second bent portions 139a, 139b. Rather, the unitary alignment pin 232 of FIG. 5 comprises a "U" shaped precision wire. The unitary alignment pin 232 may be secured a guide frame in a variety of ways, such as placement in groove features and application of adhesive, for example.

FIG. 6 depicts an embodiment of a unitary alignment pin 332 having a single bent portion 339 that is proximate a center point of the rear portion 334. The single bent portion 339 defines a protrusion that may mechanically mate with a corresponding engagement feature of the guide frame (e.g., by insertion of the single bent portion 339 into a hole or groove within the base of the guide frame). First and second pin portions 335a, 335b extend from the rear portion 334.

FIG. 7 depicts an embodiment of a unitary alignment pin 432 having an off centerline rear portion 434. Similar to the rear portion 134 of the embodiment depicted in FIGS. 4A and 4B, the off centerline rear portion 134 is offset along the z-axis with respect to the first and second pin portions 435a, 435b. The unitary alignment pin 432 depicted in FIG. 7 does not include a bent portion as the embodiments depicted in FIGS. 4A, 4B and 6. The guide frame may be designed to accept and secure the unitary alignment pin 432, such as inclusion of a groove to position the off centerline rear portion 434 as well as pass the optical fibers 104.

Figure 8:
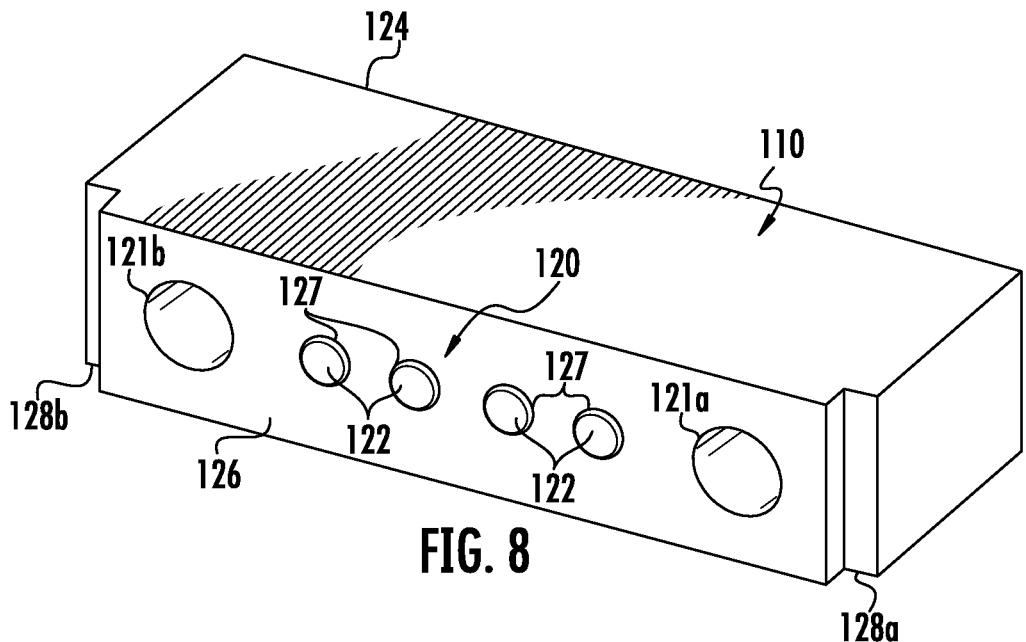
FIG. 8 is a front, top perspective view of an exemplary single-piece translating element.

Referring now to FIG. 8, the illustrated translating element 110 is a single-piece component that generally comprises a coupling surface 126, a rear surface 124, and one or more optical components 122 (e.g., GRIN lenses) maintained within bores 127 that extend from the coupling surface 126 to the rear surface 124. Ends of the optical components 122 are exposed at least at the coupling surface 126. The translating element 110 may be shaped such that it may translate within the plug housing 111. As described above, the translating element 110 may include a first notch portion 128a and a second notch portion 128b for engaging the first and second arm portions 131a, 131b.

Figure 9A:
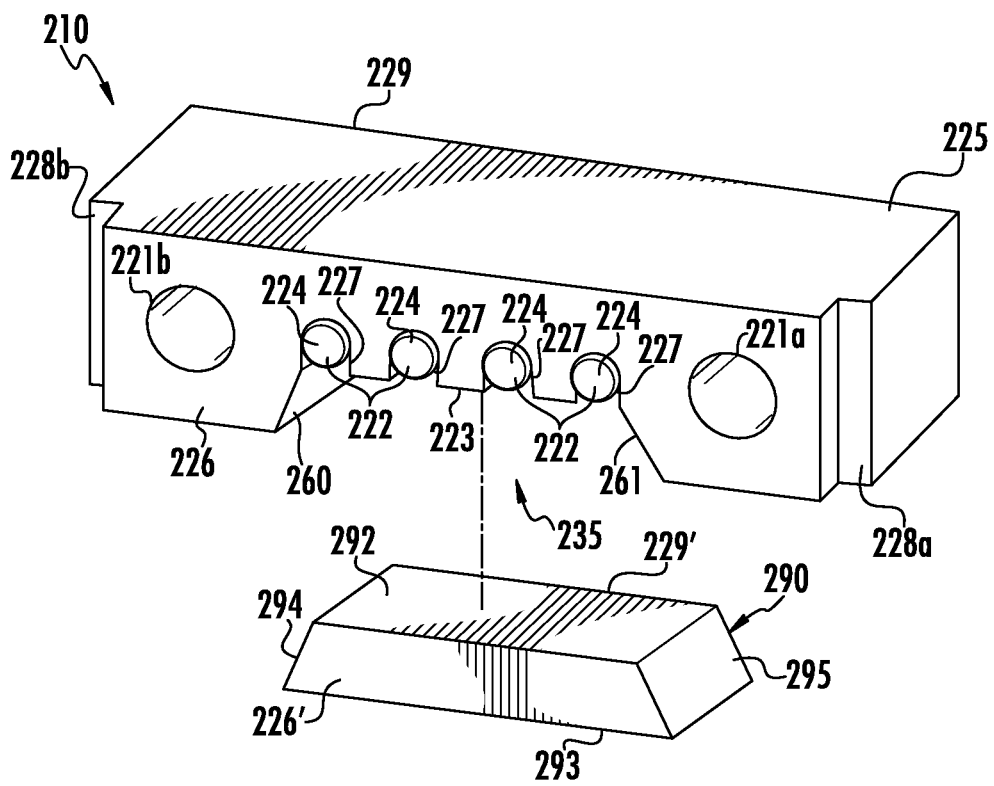
FIG. 9A is a front, top exploded view of an exemplary two-piece translating element.
Figure 9B:
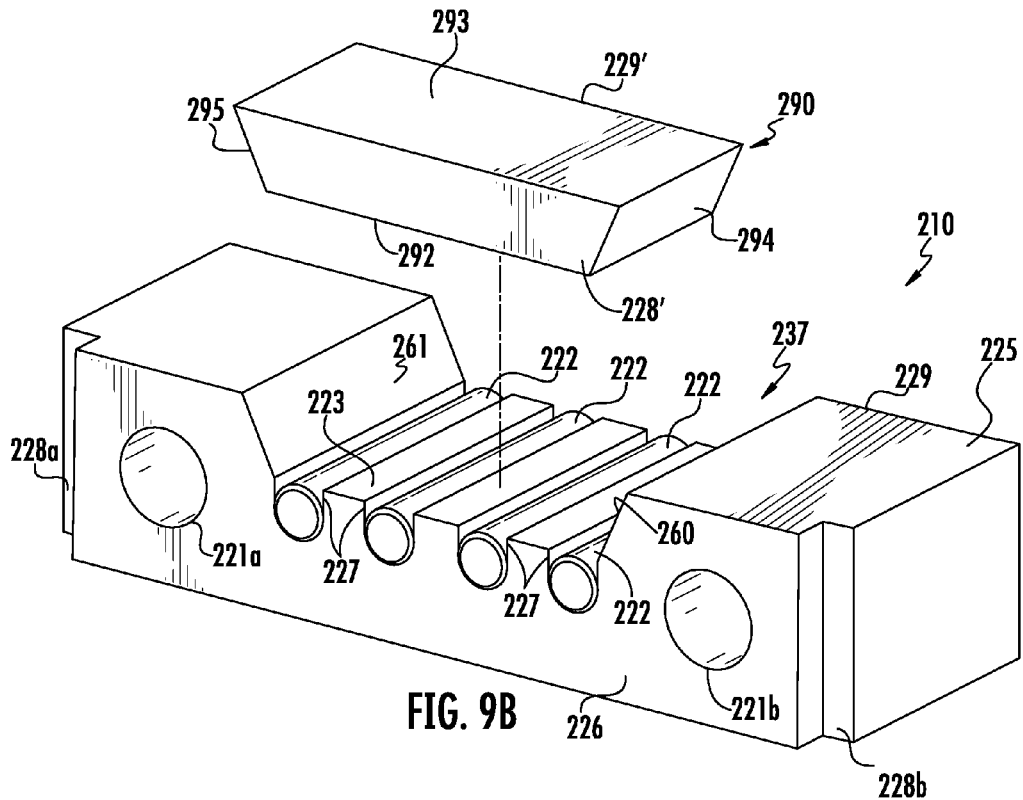
FIG. 9B is a front, bottom exploded view of the exemplary two-piece translating element depicted in FIG. 9A.
Figure 9C:
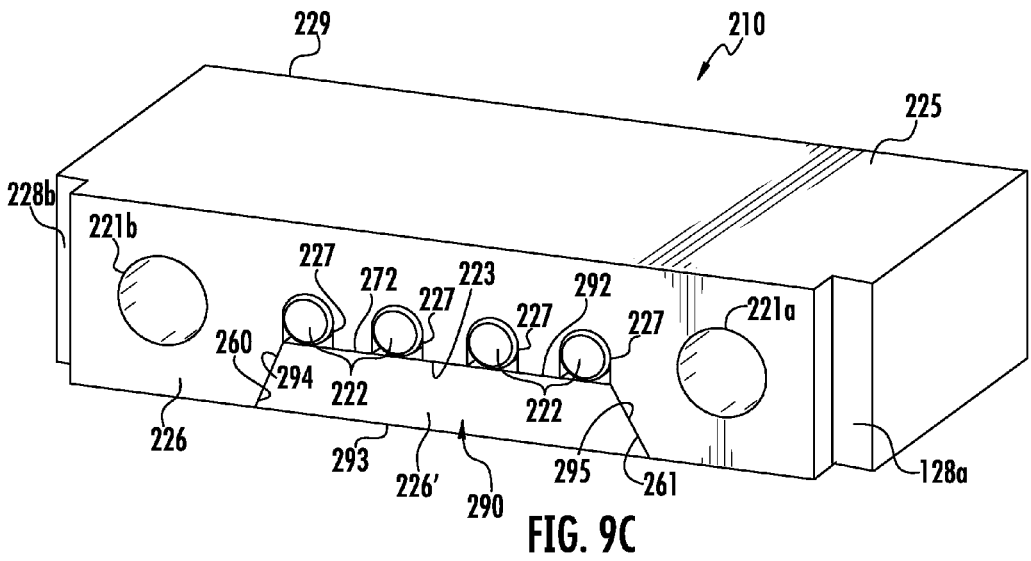
FIG. 9C is a front, top perspective view of an assembled exemplary two-piece translating element depicted in FIG. 9A.

In alternative embodiments, the translating element is a two-piece component employing a cover and alignment grooves to maintain optical components, such as GRIN lenses. FIGS. 9A-9C depict a two-piece translating element 210 in partially exploded and assembled views. The two-piece translating element 210 comprises an upper component 225 and a lower component 290 configured as a cover that fits within an opening 235 defined by the upper component 225. The assembled two-piece translating element 210 has a similar shape and configuration as the single-piece translating element 110 depicted in FIGS. 2A-3C. Similar to the single piece translating element 110, the two-piece translating element 210 has a coupling surface 226 that interfaces with a mated optical connector and a rear surface 229 that receives the optical fibers 104.

The upper component 225 comprises the first and second through-holes 221a, 221b through which the first pin and second pin may be positioned, as described above. The upper component 225 further comprises inwardly angled walls 260 and 261 that slope from a bottom surface of the upper component to an inner surface 223. The inwardly angled walls 260, 261 define an opening 235 configured to receive the lower component 290. The upper component 225 may further include the first and second notch portions 228a, 228b for engaging the first and second arm portions 131a, 131b.

The inner surface 223 of the upper component 225 comprises one or more grooves 227 that extend from the coupling surface 226 to the rear surface 229. An optical component 222, such as a GRIN lens, is positioned within each groove 227. The two-piece translating element 210 may enable easier placement of the optical components 222 because of the access to the grooves 227 provided by the opening 235. The grooves 227 may be of any appropriate geometry. In the illustrated embodiment, the grooves 227 have straight walls and a curved floor to accommodate the cylindrical optical components 222, and the inner surface 223 is planer with respect to a top surface of the optical components 222. However, other configurations are also possible, such as V-shaped grooves or rectangular grooves. The optical components 222 may be secured within the grooves 227 by a suitable adhesive, for example.

The lower component 290, which acts as a cover for the optical components 222, has an upper, optical component contacting surface 292, a bottom surface 293, and two angled walls 294, 295 that are configured to interface with inwardly angled walls 260, 261 of the upper component 225, respectively. The lower component also has a coupling surface 226' and a rear surface 229'. The lower component 290 may be positioned within the opening 235 of the upper component 225 after positioning the optical components 222 within the grooves 227 such that the optical component contacting surface 292 contacts the bottom surface 293 of the upper component 225 and the optical components 222, and angled walls 294, 295 of the lower component 290 contact inwardly angled walls 260, 261 of the upper component 225, respectively (FIG. 9C). The lower component 290 may be secured to the upper component 225 by a suitable adhesive.

The coupling surface 226' of the lower component 290 should be substantially planar with respect to the coupling surface 226 of the upper component 225 and the end faces 428 of the optical components when the lower component 290 is mated to the upper component 225. In one embodiment, the coupling surface 226' of the lower component 290, the coupling surface 226 of the of the upper component 225, and the end faces of the optical components 222 are within 10 μm of each other.

Figure 10:
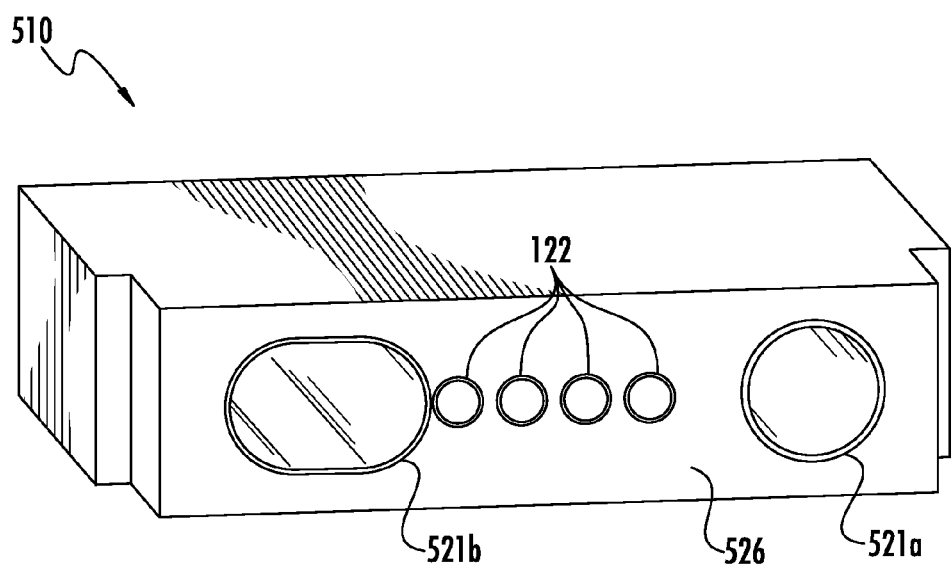
FIG. 10 is a front, top perspective view of an exemplary single-piece translating element having a wide bore and a circular bore.

FIG. 10 depicts a translating element 510 as described above, except that one of the bores within the coupling surface 526 is configured as a slot. In the illustrated embodiment, the second bore 521b is wider than the first bore 521a. A receptacle may also include a lens holder assembly having two bores where one bore is wider than the other.

It should now be understood that embodiments described herein are directed to cable assemblies, optical connector assemblies, and optical connector subassemblies employing a unitary alignment pin on which a translating element comprising an optical interface is positioned. The unitary alignment pin may reduce assembly complexity as well as reduce overall cost of the connector assembly.

As non-limiting examples, the GRIN lenses disclosed herein may comprise a generally cylindrical glass member having a radially varying index of refraction, the glass member having a length such that the lens has a pitch of less than about 0.23. As used herein, the pitch length of the lens, Lo, is $2\pi/A$; the fractional pitch, or, hereafter, pitch, is $L/Lo=LA/2\pi$, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about one (1) mm, for example, 0.8 mm. In certain embodiments, lenses having a diameter less than about 1 mm are operative to produce a beam having a mode field diameter between about 350 μm and 450 μm when illuminated with a beam having a mode field diameter of about 10.4 μm.

Examples of optical devices that can interface with the GRIN lenses disclosed in the lens holder assemblies disclosed herein include, but are not limited to, fiber optic collimators, DWDMs, OADMs, isolators, circulators, hybrid optical devices, optical attenuators, MEMs devices, and optical switches.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. An optical connector assembly comprising:
   a connector housing defining a connector enclosure and a connector housing opening;
   a unitary alignment pin formed of a single, unitary wire and comprising a first pin portion and a second pin portion, wherein the unitary alignment pin is secured within the connector enclosure; and
   a translating element comprising a first bore, a second bore, and an optical interface, wherein the first pin portion is disposed within the first bore and the second pin portion is disposed within the second bore such that the translating element translates along the first pin portion and the second pin portion within the connector enclosure and with respect to the connector housing exposing the first pin portion and the second pin portion for mating.

2. The optical connector assembly of claim 1, wherein the unitary alignment pin comprises an engagement feature configured to maintain the unitary alignment pin within the connector enclosure.

3. The optical connector assembly of claim 1, wherein the unitary alignment pin comprises a first bent portion and a second bent portion that protrude away from the first pin portion and the second pin portion, respectively, along a y-axis.

4. The optical connector assembly of claim 3, wherein the first bent portion and the second bent portion mate with engagement features within the connector enclosure.

5. The optical connector assembly of claim 4, wherein the unitary alignment pin further comprises a rear portion located in a plane that is different from a plane defined by the first pin portion and the second pin portion.

6. The optical connector assembly of claim 1, further comprising a first bias member disposed about the first pin portion and a second bias member disposed about the second pin portion.

7. The optical connector assembly of claim 1, wherein the optical interface comprises at least one GRIN lens.

8. An optical connector subassembly comprising:
   a guide frame comprising a base portion, a first arm portion, and a second arm portion, wherein the first arm portion and the second arm portion extend from the base portion such that there is a gap between the first arm portion and the second arm portion, and the guide frame is configured to be disposed in a connector housing;
   a unitary alignment pin formed of a single, unitary wire and comprising a first pin portion and a second pin portion, wherein the unitary alignment pin is secured to the guide frame at the base portion, and the first pin portion and the second pin portion are positioned within the gap between the first arm portion and the second arm portion;
   a translating element comprising a first bore, a second bore, and an optical interface, wherein the first pin portion is disposed within the first bore and the second pin portion is disposed within the second bore; and
   a first bias member and a second bias member, wherein the first bias member is disposed about the first pin portion between the translating element and the base portion of the guide frame, and the second bias member is disposed about the second pin portion between the translating element and the base portion of the guide frame such that the translating element translates along the first pin portion and the second pin portion and with respect to the connector housing exposing the first pin portion and the second pin portion for mating.

9. The optical connector subassembly of claim 8, wherein the unitary alignment pin comprises a first bent portion and a second bent portion that protrude away from the first pin portion and the second pin portion, respectively, along a y-axis.

10. The optical connector subassembly of claim 8, wherein:
    the first arm portion comprises a first engagement feature;
    the second arm portion comprises a second engagement feature;
    the unitary alignment pin comprises a first bent portion and a second bent portion; and
    the first bent portion is positioned between the first engagement feature and the base portion of the guide frame, and the second bent portion is positioned between the second engagement feature and the base portion of the guide frame.

11. The optical connector subassembly of claim 8, wherein the base portion of the guide frame further comprises a tab feature that protrudes from a surface of the base portion, wherein the tab feature is configured to provide a stopping surface for the translating element.

12. The optical connector subassembly of claim 11, wherein the unitary alignment pin further comprises a rear portion located in a plane that is different from a plane defined by the first pin portion and the second pin portion such that the unitary alignment pin is bent around the tab feature.

13. The optical connector subassembly of claim 8, wherein the base portion further comprises a fiber groove for maintaining optical fibers.

14. The optical connector subassembly of claim 8, the optical interface comprises at least one GRIN lens.

15. The optical connector subassembly of claim 8, further comprising a first electrical contact on the first arm portion of the guide frame and a second electrical contact on the second arm portion of the guide frame.

16. A cable assembly comprising:
    an optical connector body;
    an optical cable extending from a rear portion of the optical connector body, the optical cable comprising at least one optical fiber;
    a plug housing extending from a front surface of the optical connector body, wherein the plug housing defines an optical connector opening;
    a unitary alignment pin formed of a single, unitary wire and comprising a first pin portion and a second pin portion, wherein the unitary alignment pin is disposed within the optical connector body and the plug housing; and
    a translating element comprising a first bore, a second bore, and at least one GRIN lens, wherein:

the first pin portion is disposed within the first bore and the second pin portion is disposed within the second bore such that the translating element translates along the first pin portion and the second pin portion for exposing the first pin portion and the second pin portion for mating and with respect to the plug housing; and the at least one optical fiber is optically coupled to the at least one GRIN lens.

17. The cable assembly of claim 16, wherein the unitary alignment pin comprises a first bent portion and a second bent portion that protrude away from the first pin portion and the second pin portion, respectively, along a y-axis.

18. The cable assembly of claim 16, further comprising a guide frame comprising a base portion, a first arm portion, and a second arm portion, wherein:
the guide frame is disposed within the optical connector body and the plug housing;
the first arm portion and the second arm portion extend from the base portion such that there is a gap between the first arm portion and the second arm portion; and
the unitary alignment pin is secured to the guide frame at the base portion of the guide frame, and the first pin portion and the second pin portion are positioned within the gap between the first arm portion and the second arm portion.

19. The cable assembly of claim 18, further comprising a first bias member and a second bias member, wherein the first bias member is disposed about the first pin portion between the translating element and the base portion of the guide frame, and the second bias member is disposed about the second pin portion between the translating element and the base portion of the guide frame.

20. The cable assembly of claim 18, wherein:
the first arm portion comprises a first engagement feature;
the second arm portion comprises a second engagement feature;
the unitary alignment pin comprises a first bent portion and a second bent portion; and
the first bent portion is positioned between the first engagement feature and the base portion of the guide frame, and the second bent portion is positioned between the second engagement feature and the base portion of the guide frame.

21. The cable assembly of claim 18, wherein the base portion of the guide frame further comprises a tab feature that protrudes from a surface of the base portion, wherein the tab feature is configured to provide a stopping surface for the translating element.

22. The cable assembly of claim 21, wherein the unitary alignment pin further comprises a rear portion located in a plane that is different from a plane defined by the first pin portion and the second pin portion such that the unitary alignment pin is bent around the tab feature.

23. The cable assembly of claim 18, further comprising a first electrical contact on the first arm portion of the guide frame and a second electrical contact on the second arm portion of the guide frame.

24. An optical connector assembly comprising:
a connector housing defining a connector enclosure and a connector housing opening;
a unitary alignment pin formed of a single, unitary wire and comprising a first pin portion and a second pin portion, wherein the unitary alignment pin is disposed within the connector enclosure; and
a coupling surface comprising a first bore, a second bore, and an optical interface, wherein the first pin portion is disposed within the first bore and the second pin portion is disposed within the second bore such that the coupling surface and the unitary alignment pin translate within the connector enclosure and with respect to the connector housing while exposing the first pin portion and the second pin portion for mating.

* * * * *